April 26, 1949.
E. A. STALKER
PROPULSION AND BOUNDARY LAYER
CONTROL FOR AIRCRAFT
Original Filed June 17, 1946
Re. 23,105
Fig 1.
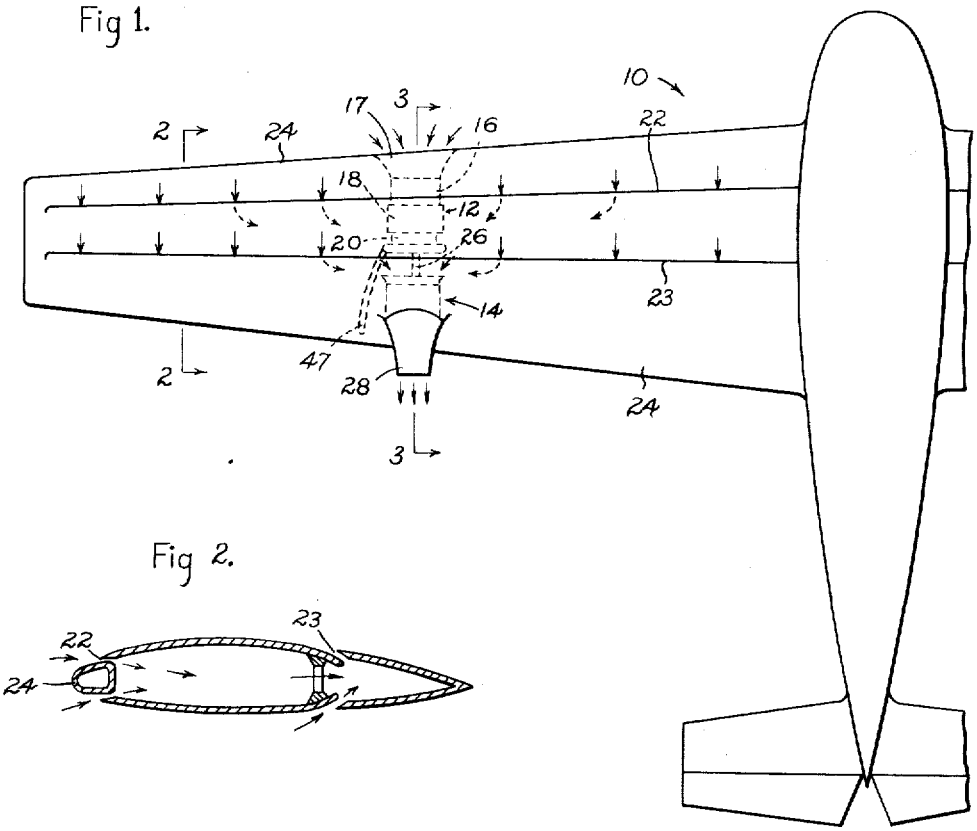
Fig 2.
Fig 3.
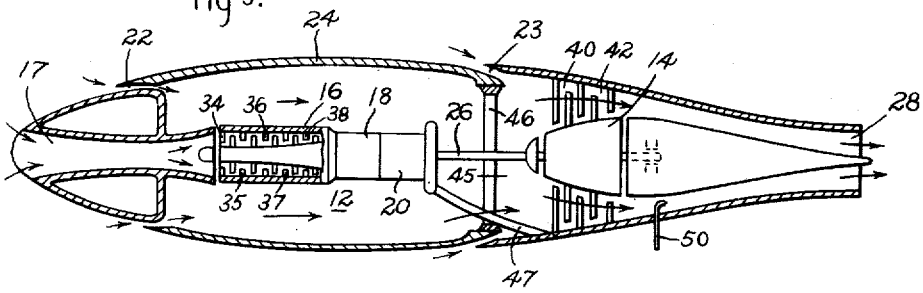
INVENTOR.
Edward A. Stalker
BY
Marschal & Biebel
ATTORNEYS Reissued Apr. 26, 1949 Re. 23,105

UNITED STATES PATENT OFFICE 23,105

PROPULSION AND BOUNDARY LAYER CONTROL FOR AIRCRAFT

Edward A. Stalker, Bay City, Mich.

Original No. 2,447,100, dated August 17, 1948, Serial No. 677,265, June 17, 1946. Application for reissue February 17, 1949, Serial No. 77,042

7 Claims. (Cl. 244—15)

This invention relates to the propulsion of aircraft particularly by a jet formed within the aircraft.

An object of the invention is to provide a propulsion means which utilizes the boundary layer air on exposed surfaces of the aircraft as the material for forming the jet in such a manner as to achieve an increase in propulsive efficiency.

Other objects and advantages will appear from the following description, the accompanying drawings, and the appended claims.

In the drawings—

Fig. 1 is a fragmentary top plan view of an airplane incorporating the means of propulsion in accordance with the present invention;

Fig. 2 is a section of the wing along the line 2—2 of Fig. 1; and

Fig. 3 is a section along the line 3—3 of Fig. 1.

Cross reference is made to pending application Serial No. 582,523, filed May 13, 1945, in which a contemporary type jet engine has its compressor inlet in communication with wing slots for inducting the boundary layer air to form the propulsive jet after heating. All the inducted air is heated and passed through a turbine which drives the compressor. In contrast in the present invention the boundary layer air is inducted by a special compressor and power-plant arrangement.

Where a conventional jet engine inducts the boundary layer into the combustion chamber, it has been found that there is a loss of thermal efficiency which, with the internal duct losses inside the wing, may be such as to substantially offset the gain in jet propulsive efficiency obtained by forming the jet out of initially slowly moving air such as composes the boundary layer. The net gain which is obtained is the drag reduction accompanying the induction of the boundary layer. This invention shows how the jet propulsive efficiency is given a high value in conjunction with a high thermal efficiency while retaining the drag reduction obtained by inducting the boundary layer.

The reason that the thermal efficiency is lower when the boundary layer is used is because the compression ratio is lowered by the loss of ram effect which is present when the jet engine has its inlet facing into the relative wind, and the loss of this effect would thus result in a lower compression ratio for any given speed of operation of the compressor.

In accordance with the present invention the jet propulsion unit is so arranged that the thermal efficiency is maintained or increased in the prime mover; the jet propulsion efficiency is given an increased value by employing the boundary layer air so as not to offset the gain in or reduce the prime mover thermal efficiency. This is accomplished by providing two channels of flow, one going to the prime mover and taking in air with the full ram pressure of the relative wind, the other conveying boundary layer air from surface slots to a special compressor which discharges the air rearward without heating to form the propulsive jet.

To obtain high or increased thermal efficiency a type of prime mover is selected which can benefit in efficiency from ram pressure of the relative wind. A reciprocating engine cannot benefit in thermal efficiency from ram pressure because its ability to expand the air is fixed by the piston stroke. It never expands the air to atmospheric pressure in the engine cylinder and adding ram pressure merely raises the pressure at which the gases in the cylinder are discharged to the atmosphere. Ram pressure is beneficial in facilitating the "breathing" ability of the engine so that the cylinders fill to capacity which increases the horsepower output per cylinder but the thermal efficiency remains substantially the same. That is, the same amount of fuel is added per horsepower hour as without ram effect.

On the other hand a gas turbine can always expand the gas to atmospheric pressure and so can benefit from ram pressure in thermal efficiency. The expansion from a higher pressure to atmospheric pressure represents an increased expansion ratio and hence a better utilization of a given amount of fuel.

In accordance with this invention the gas turbine is different from the conventional jet engine in that it is provided with a plurality of bladed rotors or runners to extract practically all the energy from the motive gas. This energy is then applied to a compressor which inducts the boundary layer from the aircraft surface and discharges it rearward as a propulsive jet. It is readily shown that this jet will have an increased efficiency of about 30%. Thus both the thermal efficiency and the jet propulsive efficiency are increased.

Referring now to the drawings which disclose a preferred embodiment of the invention, the airplane is designated generally as 10 and is propelled by the prime mover 12 and the propulsive compressor 14. The prime mover is comprised of the engine compressor 16 whose inlet 17 faces into the relative wind in such relation as to develop a ram effect. Air taken in through inlet 17 is thus compressed in the axial flow compressor 16 and such air is further heated by passage through a combustion chamber 18 where fuel is injected into the compressed air and burned. This forms heated gases which constitute the working fluid for introduction to a turbine 20 from which power is derived to drive both the compressor 16 as well as compressor 14. The gases are emitted from the turbine at relatively low velocity through the exhaust pipe 47. The flow from the engine compressor inlet to the exhaust pipe constitutes one flow system utilizing ram air to obtain high thermal efficiency in the prime mover.

The propulsive compressor 14 obtains its air from the wing slots 22 and 23 in the surface of the wing 24. The compressor is driven from the shaft 26 of the turbine 20 and consumes substantially all the power of the prime mover available for external use. The propulsive compressor inducts the boundary layer from the wing surface and discharges it rearward through the nozzle 28 as a propulsive jet. This forms a second flow system having as its inlet the slots 22 and 23 and as its exit the nozzle 28, which is independent of the first system, that is the system of the prime mover.

The propulsive compressor 14 is preferably made larger in capacity than the prime mover compressor, that is, its capacity expressed in pounds per second is larger. Furthermore the overall efficiency will be higher if the compression ratio of the jet compressor is substantially less than that of the prime mover compressor. The ordinary jet engine has the same compression ratio for all the air passing through it but by separating the system into two separate systems a predetermined proper compression ratio can be given to each.

It will be observed in Fig. 3 that axial-flow compressors are employed and that the prime mover compressor 16 has more stages than the propulsive compressor 14. The stages of the former are indicated by 34, 35, 36, 37 and 38, while those of the latter are indicated by 40 and 42.

The propulsive compressor 14 is disposed in a special relation to the turbine and the wing which is made possible by the separation of the flow systems. The conventional jet engine positioned in a wing is usually so long that the inlet of the compressor is too far forward for a direct flow from the wing slots thereto. Where reverse bends in the duct system are required for the installation to provide for use of boundary layer air, such bends greatly increase the flow losses. On the other hand if the inlet were placed far rearward the jet engine would extend out too far in back of the wing for low drag and weight and the airplane would be apt to be out of weight balance.

As shown in Fig. 3, the propulsive compressor 14 is placed well rearward in the wing so that the air inducted from the slots 22 and 23 flows directly to the compressor inlet 45, preferably located aft of the rear spar 46. This would be an important feature where the slots are in the fuselage for even in such a location the conventional jet engine may be too long for a direct flow to the compressor inlet for slots in the aft portion of the fuselage and the conventional arrangement of wings.

The gas discharged from the turbine 20 through pipe 47 can be discharged at sufficient velocity to provide a substantial thrust but for best efficiency the major part of the thrust for the airplane should come from the jet from nozzle 28.

The thrust of the propulsive jet can be augmented if desired for special conditions such as take-off and fighting. For this purpose fuel, or fuel and water, may be injected into the jet aft of the compressor, as shown at 50, which increases the speed and mass of the jet. While this is usually uneconomical, it may be satisfactory for short periods of time to develop peak performance.

To recapitulate the conventional jet engine has in effect two flows through it. One is the air flow with which fuel is initially mixed for combustion. The other is the additional air which is subsequently mixed in to give enough mass for the jet to have relatively economical propulsion and to reduce the temperature. If this jet engine is used to induct boundary layer air to form the jet the loss of ram pressure decreases the thermal efficiency to such an extent that the gain in jet propulsive efficiency from using "slow" air is largely offset. The present invention provides for subdividing the flow in the conventional jet engine so as to obtain a gain in thermal efficiency and a gain in jet propulsive efficiency. This is done in such a way that the use of boundary layer air for the propulsive jet does not destroy the thermal efficiency gain secured from using ram air.

I claim:

1. In combination in an aircraft, a surface exposed to the relative wind and having a slot therein for the induction of boundary layer air, a gas turbine prime mover having a compressor and a turbine, said prime mover compressor having an inlet for the intake of air subject to the ram pressure of the relative wind providing for operation of said turbine with greater thermal efficiency upon increased ram pressure, means to heat said air to form a hot motive fluid for operating said turbine, said turbine having a power take-off shaft for driving said prime mover compressor, a propulsive compressor operably connected to said prime mover to be rotated thereby, said propulsive compressor having an air inlet in communication with said slot to induct the boundary layer air therethrough into said propulsive compressor, and means to discharge said inducted boundary layer air rearward as a propulsive jet to propel the aircraft with increased efficiency.

2. In combination in an aircraft, a surface exposed to the relative wind and having a slot therein for the induction of boundary layer air, a gas turbine prime mover having a compressor and a turbine, said prime mover compressor having an inlet for the intake of air subject to the ram pressure of the relative wind providing for operation of said turbine with greater thermal efficiency upon increased ram pressure, means to heat said air to form a hot motive fluid for operating said turbine, said turbine having a power take-off shaft for driving said prime mover compressor, a propulsive compressor operably connected to said prime mover to be rotated thereby, said propulsive compressor having an air inlet in communication with said slot to induct the boundary layer air therethrough into said propulsive compressor, means for discharging the exhaust fluid from said turbine outside the path of flow of said propulsive compressor leaving said inducted boundary layer air in a relatively cold state, and means to discharge said inducted boundary layer air rearward as a relatively cold propulsive jet to propel the aircraft with increased efficiency.

3. In combination in an aircraft, a surface exposed to the relative wind and having a slot therein for the induction of boundary layer air, a gas turbine prime mover having a compressor and a turbine, said prime mover compressor having an inlet for the intake of air subject to the ram pressure of the relative wind providing for operation of said turbine with greater thermal efficiency upon increased ram pressure, means to heat said air to form a hot motive fluid for operating said turbine, said turbine having a power take-off shaft for driving said prime mover compressor, a propulsive compressor operably connected to said prime mover to be rotated thereby, said propulsive compressor having an air inlet in communication with said slot to induct the boundary layer air therethrough into said propulsive compressor, said propulsive compressor having a mass flow capacity substantially larger than that of said prime mover compressor, and means to discharge said inducted boundary layer air rearward as a propulsive jet to propel the aircraft with increased efficiency.

4. In combination in an aircraft, a surface exposed to the relative wind and having a slot therein for the induction of boundary layer air, a gas turbine prime mover having a compressor and a turbine, said prime mover compressor having an inlet for the intake of air subject to the ram pressure of the relative wind providing for operation of said turbine with great thermal efficiency upon increased ram pressure, means to heat said air to form a hot motive fluid for operating said turbine, said turbine having a power take-off shaft for driving said prime mover compressor, a propulsive compressor operably connected to said prime mover to be rotated thereby, said propulsive compressor having an air inlet in communication with said slot to induct the boundary layer air therethrough into said propulsive compressor having its inlet spaced substantially rearward chordwise from said turbine inlet to provide substantially direct and easy access of said inducted air thereto, and means to discharge said inducted boundary layer air rearward as a propulsive jet to propel the aircraft with increased efficiency.

5. In combination in an aircraft, a surface exposed to the relative wind and having a slot therein for the induction of boundary layer air, a gas turbine prime mover having a multi-stage axial flow compressor and a turbine, said prime mover compressor having an inlet for the intake of air subject to the ram pressure of the relative wind providing for operation of said turbine with greater thermal efficiency upon increased ram pressure, means to heat said air to form a hot motive fluid for operating said turbine, said turbine having a power take-off shaft for driving said prime mover compressor, a multi-stage axial flow propulsive compressor operably connected to said prime mover to be rotated thereby, said prime mover compressor having a greater number of stages than said propulsive compressor, said propulsive compressor having an air inlet in communication with said slot to induct the boundary layer air therethrough into said propulsive compressor, and means to discharge said inducted boundary layer air rearward as a propulsive jet to propel the aircraft with increased efficiency.

6. In combination in an aircraft, a gas turbine prime mover having a prime mover compressor capable of greater thermal efficiency with increased ram pressure, said compressor having an inlet facing into the relative wind so as to receive air under an impact pressure of said wind, said prime mover including a turbine having a flow of motive fluid therethrough, said compressor further compressing and delivering said air as a compressed fluid to said gas turbine for flow therethrough, means to heat said fluid enroute to said turbine, means to emit said fluid from said turbine as a hot propulsive jet, a wing to support the aircraft, said wind having a slot in its surface, a propulsive compressor operably connected to said turbine to be driven thereby, said propulsive compressor having its inlet in communication through said wing interior with said slot to induct the boundary layer air from said wing surface, said boundary layer air having a substantially lower velocity than said relative wind velocity, and means to discharge said boundary layer air rearward to propel the aircraft with an efficient jet, said flow through said propulsive compressor being separate from said flow through said turbine.

7. In combination in an aircraft, a gas turbine prime mover having a prime mover compressor capable of greater thermal efficiency with increased ram pressure, said compressor having an inlet facing into the relative wind so as to receive air under an impact pressure of said wind, said prime mover including a turbine having a flow of motive fluid therethrough, said compressor further compressing and delivering said air as a compressed fluid to said gas turbine for flow therethrough, means to heat said fluid enroute to said turbine, means to emit said fluid from said turbine as a hot propulsive jet, a wing to support the aircraft, said wing having a slot in its surface, a propulsive compressor, said propulsive compressor having its inlet in communication through said wing interior with said slot to induct the boundary layer air from said wing surface, said boundary layer air having a substantially lower velocity than said relative wind velocity, means to discharge said boundary layer air rearward to propel the aircraft with an efficient jet, said flow through said propulsive compressor being separate from said flow through said turbine, and means for driving said propulsive compressor from said turbine to discharge said propulsive compressor air flow through said jet discharge means at a velocity substantially greater than the velocity of said hot jet.

EDWARD A. STALKER.

REFERENCES CITED

The following references are of record in the file of this patent:

UNITED STATES PATENTS

| Number | Name | Date |
|---|---|---|
| 2,390,161 | Mercier | Dec. 4, 1945 |
| 2,396,911 | Anxionnaz | Mar. 19, 1946 |

FOREIGN PATENTS

| Number | Country | Date |
|---|---|---|
| 523,468 | Great Britain | July 15, 1940 |
| 538,022 | Great Britain | July 17, 1941 |

Certificate of Correction

Reissue No. 23,105. April 26, 1949.

EDWARD A. STALKER

It is hereby certified that errors appear in the printed specification of the above numbered patent requiring correction as follows:

Column 5, line 29, claim 4, for "great" read *greater*; line 39, same claim, after "compressor" insert the comma and words , *said propulsive compressor*;

and that the said Letters Patent should be read with these corrections therein that the same may conform to the record of the case in the Patent Office;

Signed and sealed this 20th day of September, A. D. 1949.

[SEAL]

JOE E. DANIELS,
*Assistant Commissioner of Patents.*